US005408087A

United States Patent [19]

Thomas

[11] Patent Number: 5,408,087

[45] Date of Patent: Apr. 18, 1995

[54] IMAGE INTENSIFIER GAIN UNIFORMITY IMPROVEMENTS IN SEALED TUBES BY SELECTIVE SCRUBBING

[75] Inventor: Stanley W. Thomas, Livermore, Calif.

[73] Assignee: The Regents of the University of California, Oakland, Calif.

[21] Appl. No.: 129,731

[22] Filed: Sep. 14, 1993

[51] Int. Cl.[6] .......... H04N 5/32; H01J 9/12

[52] U.S. Cl. .......... 250/214 VT; 250/214 A; 250/214 C; 250/214 LS; 250/214 SW

[58] Field of Search .......... 250/214 A, 214 C, 214 LS, 250/214 SW, 214 R, 214 VT

[56] References Cited

U.S. PATENT DOCUMENTS

| | | | |
|---|---|---|---|
| 4,178,528 | 12/1979 | Kennedy | 250/273 VT |
| 4,178,529 | 12/1979 | Kennedy | 250/273 VT |
| 4,541,106 | 9/1985 | Belanger et al. | 378/92 |
| 4,638,355 | 1/1987 | Melman | 358/11 |
| 5,314,363 | 5/1994 | Murray | 445/14 |

OTHER PUBLICATIONS

S. W. Thomas et al., "Microchannel Plate Intensifier Gain Uniformity Improvement in Sealed Tubes by Selective Scrubbing", prepared for the 20th International Congress on High Speed Photography and Photonics, Victoria, BC, Canada, Sep. 21–25, 1993, Lawrence Livermore National Laboratory Paper No. UCRL-J-C-109349.

*Primary Examiner*—William L. Sikes
*Assistant Examiner*—Fetsum Abraham
*Attorney, Agent, or Firm*—Henry P. Sartorio; John P. Wooldridge

[57] ABSTRACT

The gain uniformity of sealed microchannel plate image intensifiers (MCPIs) is improved by selectively scrubbing the high gain sections with a controlled bright light source. Using the premise that ions returning to the cathode from the microchannel plate (MCP) damage the cathode and reduce its sensitivity, a HeNe laser beam light source is raster scanned across the cathode of a microchannel plate image intensifier (MCPI) tube. Cathode current is monitored and when it exceeds a preset threshold, the sweep rate is decreased 1000 times, giving 1000 times the exposure to cathode areas with sensitivity greater than the threshold. The threshold is set at the cathode current corresponding to the lowest sensitivity in the active cathode area so that sensitivity of the entire cathode is reduced to this level. This process reduces tube gain by between 10% and 30% in the high gain areas while gain reduction in low gain areas is negligible.

22 Claims, 4 Drawing Sheets

IMAGE INTENSIFIER GAIN UNIFORMITY IMPROVEMENTS IN SEALED TUBES BY SELECTIVE SCRUBBING

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to microchannel plate image intensifiers (MCPIs), and more particularly, to a method for improving the gain uniformity of MCPIs.

2. Description of Related Art

A microchannel plate image intensifier (MCPI) comprises a photocathode (which converts input photons to electrons), a microchannel plate (which amplifies the number of electrons), and a phosphor screen (which converts the electron current back into photons). Gain uniformity in microchannel plate image intensifiers is important when measuring small changes in intensity. To improve a system's ability to detect these small intensity changes involves correcting for spatial non-uniformity in the imaging system, a process which reduces the system's dynamic range. Increasing the digitizing resolution (more digitizing bits) to compensate for a dynamic range loss is difficult due to the high data rate required to transmit the data in some applications. The alternative is to improve uniformity of the imaging system so that the dynamic range loss will be minimized during non-uniformity correction. Microchannel plate image intensifier (MCPI) non-uniformity dominates system non-uniformity. Tube manufacturers have had difficulty in producing MCPIs with non-uniformities of +10% or better.

Scrubbing is a term used to describe the process for removing surface gas molecules residing in the channels of a microchannel plate (MCP) or trapped in the phosphor screen area. Gas molecules inside the channels can be struck and ionized by electrons traveling from the input to the output of the MCP. These ions will be accelerated towards the input by the electric field. When they encounter the MCP wall, secondary electrons can be generated, causing a net increase in secondary electrons, which, in turn, can dislodge and ionize more gas molecules (similar to positive feedback). The result is an unstable gain characteristic of the MCP, where gain increases with input electron current. Initial MCP gain can be in the order of 10,000 and is reduced to about 1,000 by scrubbing, where gain becomes stable, not increasing as input current is increased. During vacuum processing of a MCPI, and before the cathode is formed and sealed to the tube body, the MCP-Screen assembly is "scrubbed" with electrons from either an electron gun or a temporary "scrubbing" photocathode. Voltages are applied to the MCP and screen regions. The electrons are accelerated to the MCP input where they strike, causing release of secondaries, as in normal tube operation. The electrons cascade through the MCP and strike the screen. On their journey, they encounter gas molecules, striking and ionizing some of them as they proceed. The ionized molecules are accelerated toward the MCP input by the electric field and are pumped out of the chamber by the vacuum system. One scrubbing process used by industry involves incrementally increasing MCP voltage and changing the input electron current over a period of approximately four hours, ending with an output current density of approximately 0.4 mA/cm$^2$.

Besides causing unstable gain characteristics in the MCP, in a sealed tube, the gas molecules leaving the MCP input will be accelerated to the cathode where they collide with cathode material and damage the cathode, reducing its sensitivity. This effect damages all cathodes, but is particularly devastating to GaAs (Gen III) cathodes, where, in addition to electron scrubbing, a film is applied to the MCP input surface to block the ions as they leave. It would be beneficial if this mechanism for damaging cathode sensitivity could be used to improve the uniformity of sealed tubes. The present invention provides this benefit.

SUMMARY OF THE INVENTION

It is an object of the present invention to provide means for improving the gain uniformity of sealed microchannel plate image intensifiers.

The gain uniformity of sealed microchannel plate image intensifiers (MCPIs) is improved by selectively scrubbing the high gain sections with a controlled bright light source. Using the premise that ions returning to the cathode from the MCP damage the cathode and reduce its sensitivity, a helium-neon (HeNe) laser beam light source is raster scanned across the cathode of a microchannel plate image intensifier (MCPI) tube. Cathode current is monitored and when it exceeds a preset threshold, the sweep rate is decreased 1000 times, giving 1000 times the exposure to cathode areas with sensitivity greater than the threshold. The threshold is set at the cathode current corresponding to the lowest sensitivity in the active cathode area so that sensitivity of the entire cathode is reduced to this level. This process reduces tube gain by between 10% and 30% in the high gain areas while gain reduction in low gain areas is negligible.

DETAILED DESCRIPTION OF THE INVENTION

Figure 1:
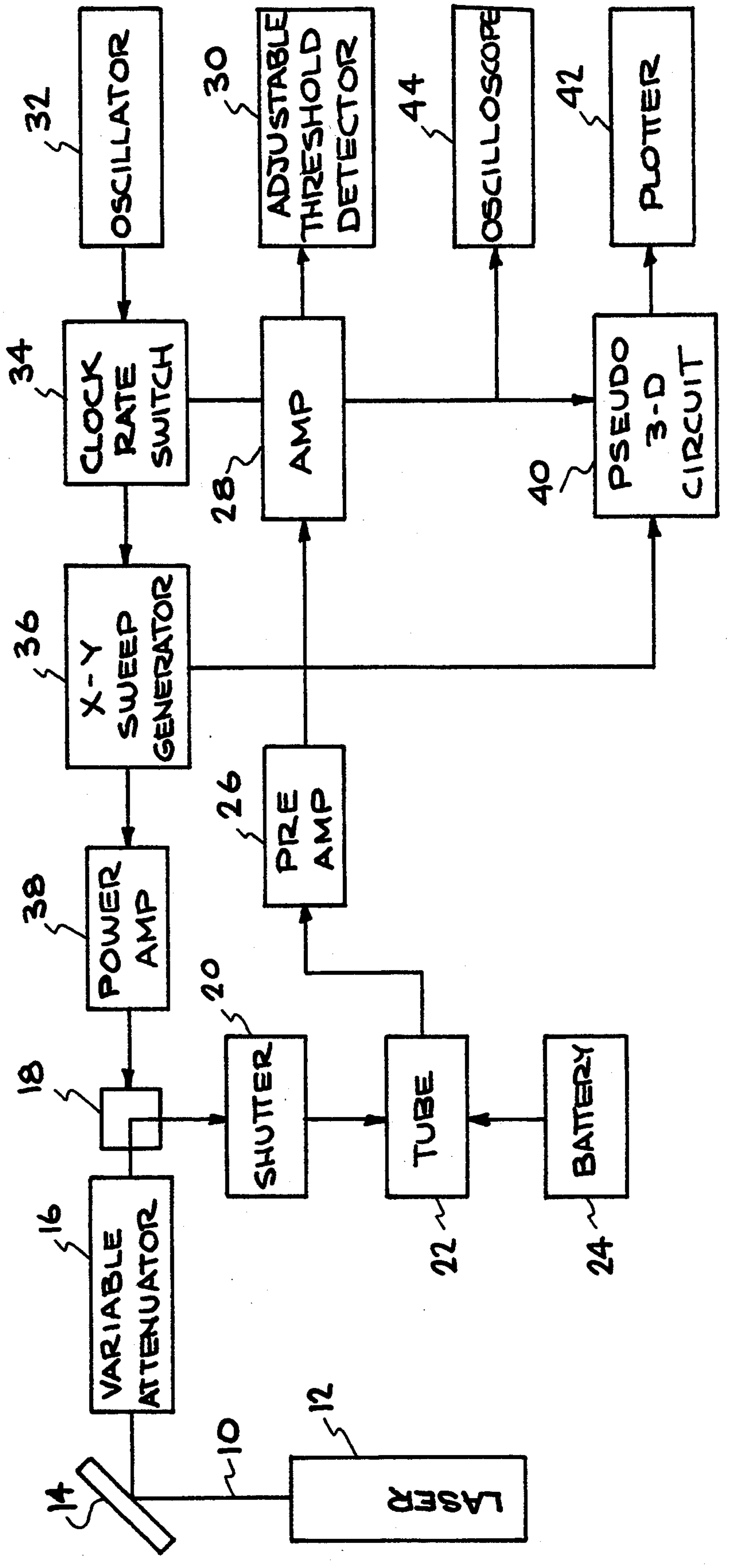
FIG. 1 is a schematic of the Scrubber.

The preferred embodiment of the scrubber is shown in FIG. 1. A beam 10 from a 10 milliwatt (mw) helium-neon (HeNe) laser 12 passes through a variable attenuator 16, used to adjust the intensity of beam 10. Beam 10 then passes through an x-y deflector 18 comprised of two galvanometer motor driven mirrors, one providing horizontal deflection, and the other providing vertical deflection of laser beam 10. An electrically actuated mechanical shutter 20 is positioned to block the beam before it strikes tube 22 under test, when the test is to be terminated. The scrubber operates in the cathode mode and the micro channel plate (M CP) mode. In the cathode mode, cathode current is monitored and compared to a threshold, resulting in scrubbing the cathode only. In the MCP mode, the MCP output current is compared to a threshold, resulting in scrubbing the cathode/MCP to compensate for the non-uniformity of the combination. When operated in the cathode mode, tube 22 is powered by battery supply 24, with 300 volts delivered to the cathode and 600 volts to the MCP. The cathode is operated at ground, with +300 volts at the MCP input. The MCP screen is operated at the MCP output voltage (no screen field). For the MCP mode, supply 24 provides 250 volts to the cathode/MCP gap. The screen gap is operated at 200 volts with the screen operated at ground potential. While it is recognized that nearly all MCPIs (except filmed, Gen III tubes) have a cathode-operating voltage rating of 180 volts, they will support 300 volts. Ion damage will be accelerated with this higher voltage, so 250 to 300 volts is used. Current from tube 22 being scrubbed is amplified by a preamplifier 26 with a gain of 1.2 Volts/$\mu$A connected very close to tube 22. Preamplifier input polarity is reversible by a switch because the tube output current is negative in the cathode mode and positive in the MCP mode. Following preamplifier 26 is an amplifier 28 which provides an additional switchable gain of between 100 and 1000 and options for inversion of the output signal polarity to accommodate various monitor requirements. Total gain from amplifier 28 is 0.12 Volts/nA in the normal, low gain, scrubbing mode, with the rise time equal to 15.4$\mu$s. The high gain switch position is used for viewing the scrubbing results. The total gain for the high gain switch position is 1.2 Volts/nA and the rise time is 110 $\mu$s. During viewing, the MCP voltage is turned off in order to prevent additional scrubbing and uniform cathode sensitivity decrease, since the threshold detector and feedback circuitry are defeated in this mode.

Figure 2:
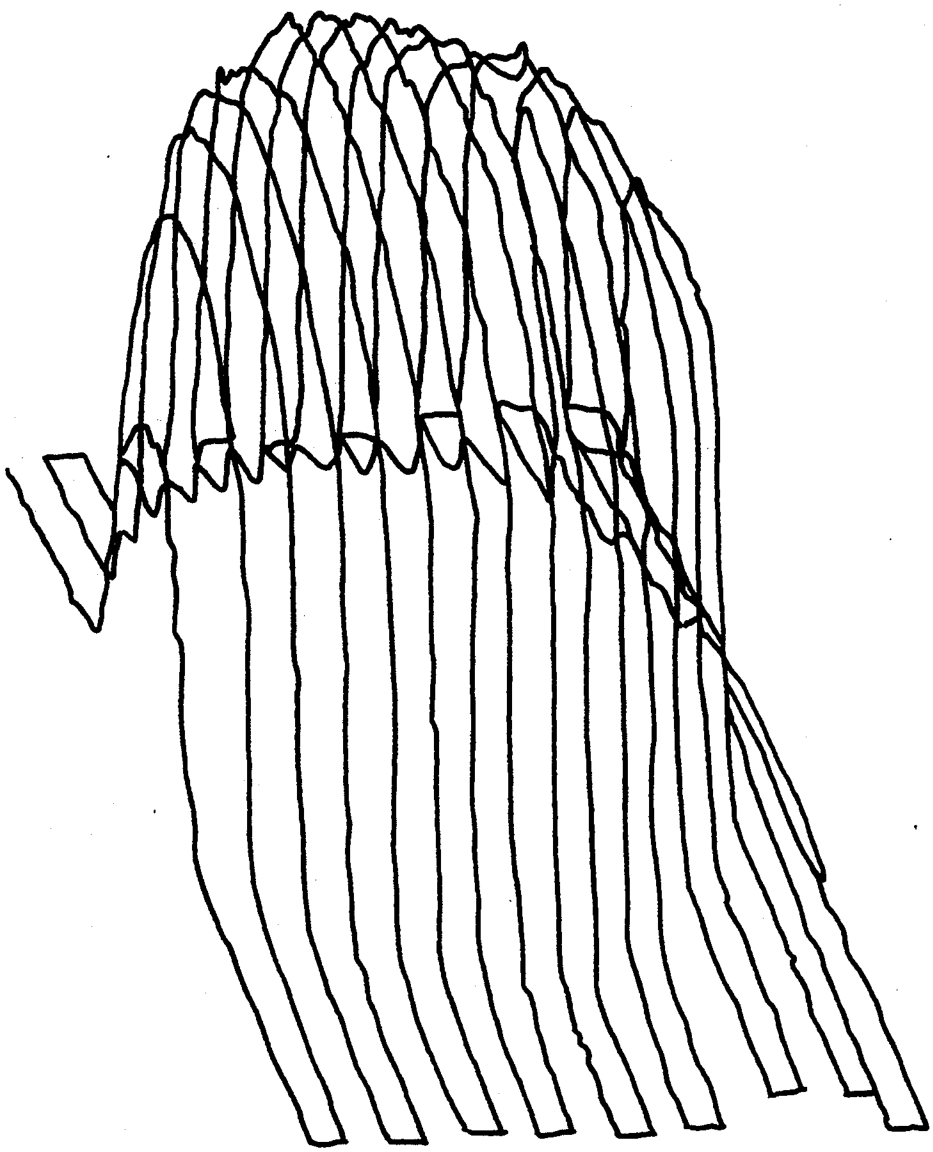
FIG. 2 shows the output of a tube scrubbed in the cathode mode with the CRT source.

Following amplifier 28 is an adjustable threshold detector (ATD) 30 which is set at the cathode current corresponding to the lowest sensitivity in the active cathode area so that the sensitivity of the entire cathode is reduced to this level. Clock rate switch 34 receives a 100 $\mu$s clock signal from oscillator 32. ATD 30 provides an input to switch 34 which causes the 100 $\mu$s output from oscillator 32 to be scaled by 1000 to produce a 100 ms clock) when amplifier 28 exceeds the level set at threshold detector 30. The output from switch 34 is fed into x-y sweep generator 36 which is comprised of an up/down counter, which scales the clock by 1024 lines per frame, and a digital to analog (D/A) converter which produces a 10-bit triangular up/down ramp with a ramp time of 100 milliseconds (ms), switchable to 100 seconds when the threshold is exceeded. The output from 36 is fed into power amplifier 38 and the amplified output is used to drive one of the galvanometer deflectors in x-y deflector 18 to deflect the beam in the Y direction and is called the "line" output of the raster scan. A second counter follows the first, scaling the output of the first by an additional 1024 lines per frame, and is used to drive the second D/A converter. Its output is amplified and drives the second galvanometer deflector, which moves the beam in the X direction, creating the "frame" drive of the raster scan with a frame time of 100 seconds, which switches to 28 hours when the threshold is exceeded. Since much of the tube area is normally below the threshold, it generally takes in the order of 30 minutes for the first scan with less time as the scrubbing progresses. As soon as the voltage from amplifier 28 drops below the threshold at ATD 30, the sweep speeds up again, so no area can receive scrubbing which will drop its sensitivity below the threshold by a measurable amount. A counter in sweep generator 36 releases (closes) the shutter, terminating the test automatically, when two scans have been completed without exceeding the threshold. Additional circuitry permits decreasing the number of lines per frame from the normal 1024 to as few as 16 for viewing, setup and plotting. During plotting, the slow frame time and 16 (as shown in FIG. 2) to 128 lines per frame (shown in FIG. 3) are selected to keep the input voltage change rates within the plotter response time and make plotting time reasonable. The specific numbers mentioned for times, rates and bits are for example only.

Figure 3:
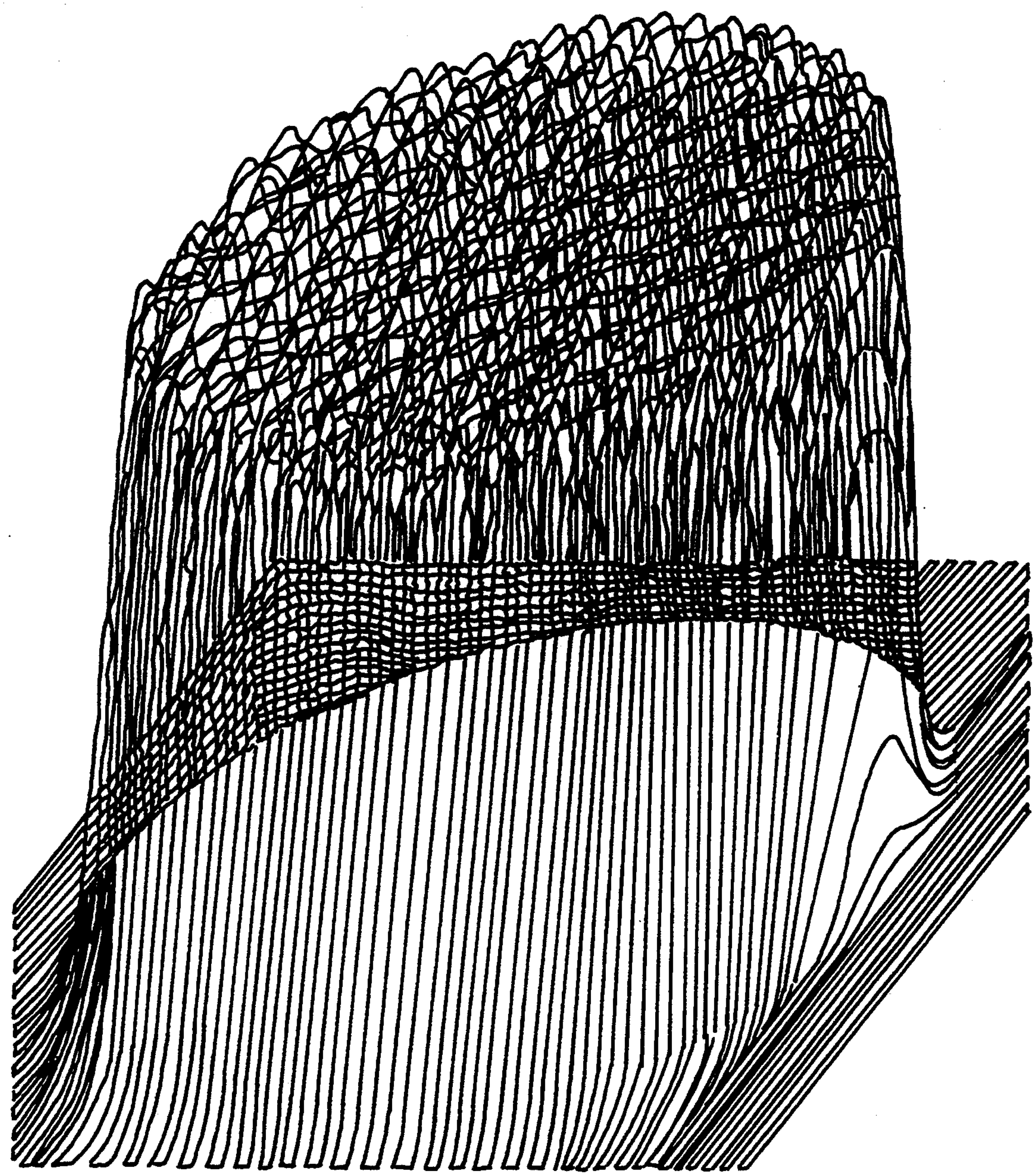
FIG. 3 shows the output of a tube scrubbed in the MCP mode with the laser source.

A Pseudo 3-D circuit 40 takes the X- and Y-sweep wave forms from sweep generator 36 and the output from amplifier 28 (Z-axis intensity signal) and creates an X and Y signal for a plotter 42. FIG. 2 shows a 16-lines-per-frame plotter output for a tube scrubbed in the cathode mode with the CRT source, and FIG. 3 shows a different tube after being scrubbed in the MCP mode with the laser source. An oscilloscope 44 is used to view the output from amplifier 28 for setting the threshold level of ATD 30 and, in the X-Y-Z mode, for displaying a 3-D (X and Y plus intensity) picture of the tube output (as would be seen in normal tube operation).

Ion damage decreases cathode sensitivity in the red part of the cathode spectral response more severely than elsewhere. This method of improving uniformity can only be used for one specific wavelength (particularly if it is in the long wavelength portion of the spectrum). Fluors which emit light at 380 nm to 440 nm are typically used, and uniformity is good within this range after scrubbing.

During scrubbing with the laser, input intensity is between one and six mW/cm$^2$, while during a uniformity measurement, the intensity is of the order of 0.5 $\mu$W/cm$^2$. During scrubbing, the output current is about 70 nA, which translates to 18 $\mu$A/cm$^2$, or an equivalent of 46 $\mu$A, if the entire cathode were exposed to this level. Even in the view mode, where these numbers are reduced by 10 times, the current density is still very high. Since normal MCP strip current is only about 3 $\mu$A for an 18-mm tube, the MCP charmels are certainly operating in a non-linear, saturated region.

Non-uniformity (NU), expressed in plus and minus percent, is defined in the following equation:

$$NU = \pm \frac{H - L}{H + L} \times 100\%,$$

where H and L are the maximum and minimum brightness, respectively, observed on the output phosphor screen. For the ratio of H to L equal to 2, NU is +33.3%, which is the usual military requirement. When NU is +10%, H/L=1.22.

Figure 4:
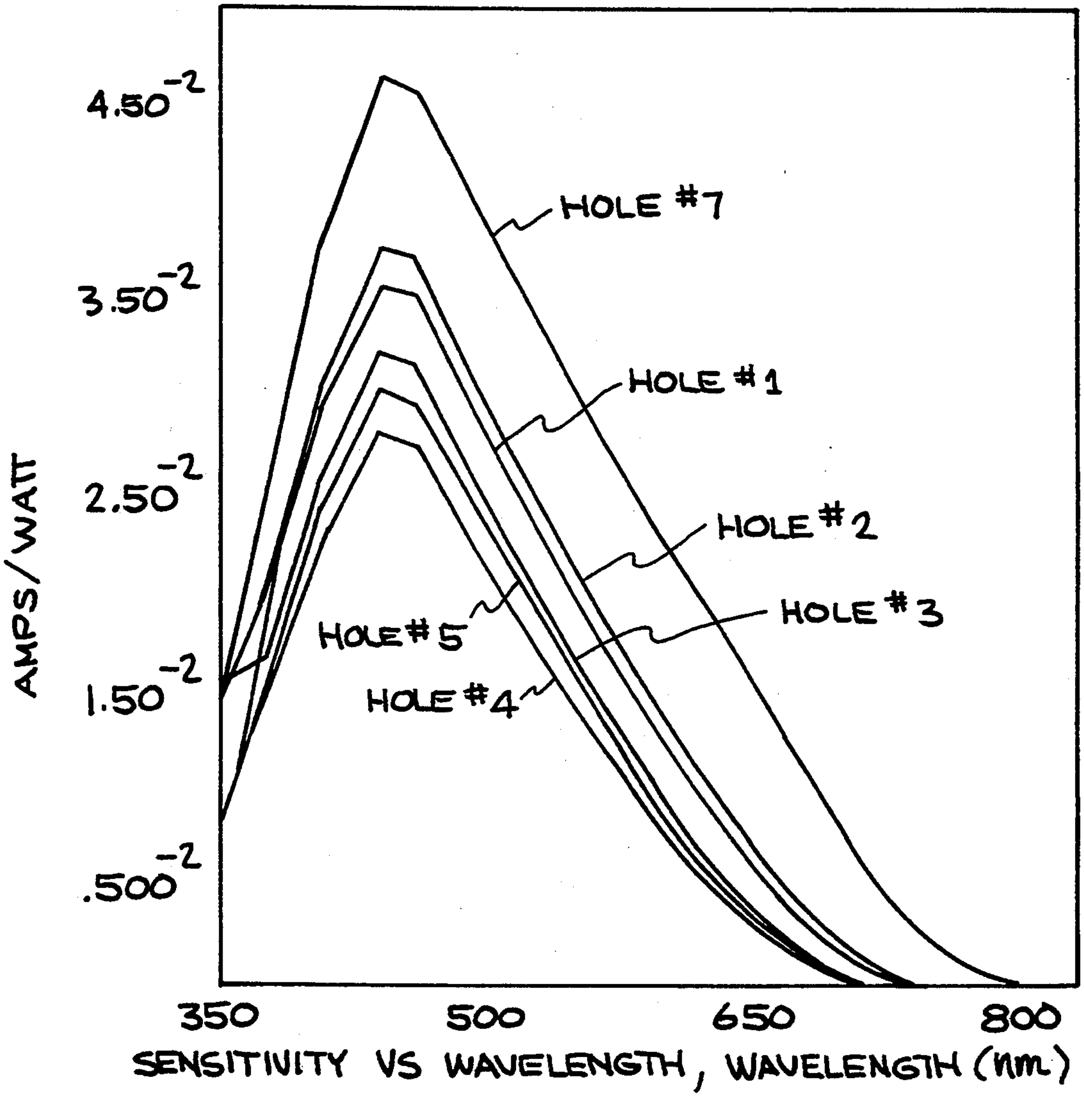
FIG. 4 shows the cathode spectral response of a typical scrubbed tube.

Since cathode damage from ions is greater at long wavelengths, it is necessary to scrub tubes with the wavelength of light to be used in the application. This is not quite as important for the blue and green spectral regions as it is if the use will be in the red. This is due to the reduced sensitivity of cathodes in the red as FIG. 4 shows for the cathode spectral response of seven differently scrubbed areas of a photocathode tube. A tube, scrubbed with the HeNe laser (632 nm), was measured at 633 nm and again at 520 nm, giving non-uniformity results of +24.3% and +22.7% respectively, not a serious difference.

Changes and modifications in the specifically described embodiments can be carried out without departing from the scope of the invention, which is intended to be limited by the scope of the appended claims.

I claim:

1. An apparatus comprising:

(a) a microchannel plate image intensifier (MCPI) including a photocathode and a microchannel plate (MCP); and (b) means for selectively damaging said photocathode with ions from said MCP to reduce sensitivity of high gain areas of said photocathode thereby improving gain uniformity of said MCPI.

2. The apparatus of claim 1, wherein said damaging means comprises:

(a) means for producing an adjusted intensity beam;

(b) means for raster scanning said beam at a first known sweep rate to produce a rastered beam;

(c) means for directing said rastered beam onto said photocathode of said MCPI;

(d) means for receiving a signal from said MCPI after said rastered beam has been directed onto said photocathode; and (e) means for decreasing said first known sweep rate to a second known sweep rate when said signal from said MCPI exceeds a threshold.

3. The apparatus of claim 2, wherein said producing means comprises:

(a) a variable attenuator; and (b) a laser producing a beam which is passed through said variable attenuator.

4. The apparatus of claim 2, wherein said laser comprises a helium-neon laser.

5. The apparatus of claim 2, wherein said producing means comprises:

(a) a white light collimator;

(b) a variable attenuator; and (c) a white light source producing a beam which is passed through said collimator and said variable attenuator to produce a well collimated white light source which is directed onto said photocathode.

6. The apparatus of claim 2, wherein said producing means comprises:

(a) a focussing lens system;

(b) a variable attenuator; and (c) a light source producing a beam which is passed through said focussing lens system and said variable attenuator to produce a well focussed beam which is focussed to a small spot on said photocathode.

7. The apparatus of claim 2, wherein said raster scanning means comprise passing said adjusted intensity beam through an x-y deflector.

8. The apparatus of claim 7, wherein said x-y deflector comprises two galvanometer motor driven mirrors, one providing horizontal deflection and the other providing vertical deflection of said beam.

9. The apparatus of claim 2, wherein said receiving means comprise means for monitoring a current produced by said photocathode of said MCPI.

10. The apparatus of claim 9, wherein said monitoring means comprises:

(a) a preamplifier to provide preamplification of said current, said preamplifier producing a preamplified current to voltage conversion and further comprising means for polarity inversion;

(b) an amplifier to provide amplification of said preamplified voltage, said amplifier producing an amplified voltage and further comprising means for polarity inversion; and (c) an adjustable threshold detector (ATD) to receive said amplified voltage, said ATD set at a cathode current corresponding to a lowest sensitivity of active area of said cathode.

11. The apparatus of claim 10, wherein said decreasing means comprise:

(a) a 100 microsecond clock signal oscillator;

(b) a clock rate switch to receive said clock signal;

(c) a signal from said ATD;

(d) means for scaling said clock rate switch by 1000 to produce a 100 ms clock when said amplifier exceeds a threshold level set at said ATD; and (e) means for inputting said 100 ms clock into an x-y generator to produce said second known sweep.

12. The apparatus of claim 11, Wherein said x-y generator comprises:

(a) a first up/down counter to divide said 100 ms clock by 10 bits;

(b) a first digital to analog (D/A) converter driven by said first up/down counter, further comprising means for producing a 10 bit triangular up/down ramp, said ramp having a ramp time of 100 ms switchable to 100 seconds when said threshold is exceeded;

(c) a second up/down counter to divide an output of said first up/down counter by an additional 10 bits; and (d) a second D/A converter driven by said second up/down counter, further comprising means for producing a 10 bit triangular up/down ramp, said ramp having a ramp time of 100 ms switchable to 100 seconds when said threshold is exceeded.

13. The apparatus of claim 12, further including an x-y deflector wherein said x-y deflector includes;

(a) means for receiving a first D/A converter signal from said first D/A converter after amplification, wherein said first D/A signal drives a y-direction galvanometer of said x-y deflector; and (b) means for receiving a second D/A converter signal from said second D/A converter after amplification, wherein said second D/A signal drives a x-direction galvanometer of said x-y deflector.

14. The apparatus of claim 13, wherein said raster scanning means comprises a frame time of 100 seconds which switches to 28 hours when said threshold is exceeded.

15. The apparatus of claim 14, wherein said first up/-down counter and said second up/down counter further comprise means for decreasing lines per frame from 1024 to a number of frames within a range of 1024 to 16, for viewing, setup and plotting.

16. The apparatus of claim 2, wherein said receiving means comprise means for monitoring an output current as collected on a screen of said microchannel plate (MCP).

17. The apparatus of claim 2, further comprising means for returning said sweep rate to said first known rate when a signal from said MCPI decreases below said threshold.

18. The apparatus of claim 17, further comprising means for preventing said beam from striking said MCPI when two scans have been completed without exceeding said threshold.

19. The apparatus of claim 2, further comprising plotting means comprising a Pseudo 3-D circuit wherein x and y sweep waveforms from said sweep generator are combined with an output from said amplifier to create an x-y plot of said sweep.

20. The apparatus of claim 2, further comprising an oscilloscope to view an output of said amplifier and to set said threshold level of said ATD and for displaying a picture of an output from said MCPI.

21. The apparatus of claim 2, wherein said adjusted intensity beam is set at a wavelength to be used in an application of said MCPI.

22. The apparatus of claim 2, wherein said second known sweep rate is a variable sweep rate proportional to a change in said signal from said MCPI.

* * * * *